United States Patent
Godfrey et al.

[11] Patent Number: 6,024,326
[45] Date of Patent: Feb. 15, 2000

[54] WATER-IMPACT RELEASE MECHANISM

[75] Inventors: Daniel M. Godfrey, North Kingstown; Gary R. Berlam, Warwick, both of R.I.

[73] Assignee: The United States of America as represented by the Secretary of the Navy, Washington, D.C.

[21] Appl. No.: 09/062,566

[22] Filed: Apr. 20, 1998

[51] Int. Cl.[7] ...................................................... B64D 1/02
[52] U.S. Cl. ................................. 244/151 B; 244/138 R; 244/139
[58] Field of Search ............................... 244/138 R, 139, 244/151 B, 137.3, 137.4; 114/22; 74/527

[56] References Cited

U.S. PATENT DOCUMENTS

| | | | |
|---|---|---|---|
| 2,778,308 | 1/1957 | Fogal et al. | 244/151 B |
| 2,880,687 | 4/1959 | Kilvert | 114/22 |
| 3,066,632 | 12/1962 | Bemis | 114/22 |
| 4,132,147 | 1/1979 | Contaldo | 244/137.3 |
| 4,592,524 | 6/1986 | Nohern et al. | 244/138 R |

*Primary Examiner*—Peter M. Poon
*Assistant Examiner*—Charles R Ducker, Jr.
*Attorney, Agent, or Firm*—Michael J. McGowan; James M. Kasischke; Prithvi C. Lall

[57] ABSTRACT

A water-impact release mechanism has a hub with a first sleeve coupled thereto. The first sleeve has a plurality of circumferentially distributed holes therein. A spring assembly, coupled to the hub, extends into the first sleeve. In a relaxed state, the spring assembly obstructs the holes while, in a compressed state, the spring assembly does not obstruct the holes. A second sleeve, concentric with the first sleeve, is elastically coupled to the hub and biased away therefrom. The second sleeve has an inwardly-facing annular groove. A ball resides in each of the holes and is large enough to extend beyond the confines of its hole. When the bias of the second sleeve is overcome, the annular groove aligns with the holes in the first sleeve thereby allowing the radial outward movement of the balls. A plate, coupled to the second sleeve, extends radially outward therefrom to define a water-impact surface. Water-impact forces impinging on the plate cause the bias of the second sleeve to be overcome such that the second sleeve abuts the hub.

13 Claims, 2 Drawing Sheets

WATER-IMPACT RELEASE MECHANISM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to release mechanisms, and more particularly to a water-impact release mechanism used to couple a deceleration device, e.g., a parachute, to the aft end of an air-deployed device, e.g., a torpedo.

(2) Description of the Prior Art

In some Navy applications, torpedoes having air stabilizing devices (e.g., a parachute) are launched from an aerial platform (e.g., helicopter, airplane, etc.). The use of an air stabilizing device reduces the velocity upon water impact in order to prevent damage to the torpedo's structure or control systems. The air stabilizing device is generally coupled to the aft end of the torpedo by means of a release mechanism that causes the air stabilizing device to separate from the torpedo when it strikes the water. More specifically, a tail nut (i.e., similar to a hitching ball) generally extends from the aft end of the torpedo for cooperation with the release mechanism.

A variety of release mechanisms have been designed and used by the Navy. One type of release mechanism is disclosed in U.S. Pat. No. 2,880,687 where the aft end of the torpedo employs concentric sleeves to position and press a plurality of balls into engagement with a shaped plug mounted on the air stabilizing device. At impact with the water, deceleration of the torpedo brings about inertial movement of one of the sleeves such that the balls are allowed to disengage from the shaped plug. However, the inertial force is opposite that of the friction force generated by the drag force of the air stabilizing device. Accordingly, if the inertial force does not overcome the drag force sufficiently, the release mechanism can fail causing the torpedo to drag the air stabilizing device into the water.

SUMMARY OF THE INVENTION

Accordingly it is an object of the present invention to provide a water-impact release mechanism.

Another object of the present invention is to provide a water-impact release mechanism that is a reliable in its release operation.

Still another object of the present invention is to provide a water-impact release mechanism that securely retains a payload until time of release.

Yet another object of the present invention is to provide a water-impact release mechanism that is simple to use.

Other objects and advantages of the present invention will become more obvious hereinafter in the specification and drawings.

In accordance with the present invention, a water-impact release mechanism has a hub with a first sleeve coupled to and extending from the hub. The first sleeve defines a plurality of holes distributed about the circumference thereof and extending therethrough. A spring assembly is coupled to the hub and extends into the first sleeve. In a relaxed state, the spring assembly obstructs the holes from within the first sleeve. However, in a compressed state, the spring assembly does not obstruct the holes. A second sleeve is concentric with the first sleeve and is elastically coupled to the hub such that it has a bias away therefrom. The second sleeve can move axially about the first sleeve. The second sleeve has an inwardly-facing annular groove formed therein in a plane perpendicular to a longitudinal axis of the second sleeve. A ball resides in each of the holes in the first sleeve and is large enough to extend beyond the confines of its hole. Each ball is pressed into engagement with a device to be released when i) the device is inserted into the first sleeve to compress the spring assembly to said compressed state, and ii) the second sleeve is in a position such that the annular groove is misaligned with respect to the holes in the first sleeve. However, when the bias is overcome such that the second sleeve abuts the hub, the annular groove is aligned with the holes in the first sleeve thereby allowing the radial outward movement of the balls. A plate is coupled to the second sleeve and extends radially outward therefrom to define a water-impact surface. Water-impact forces impinging on the plate cause the bias of the second sleeve to be overcome such that the second sleeve abuts the hub.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
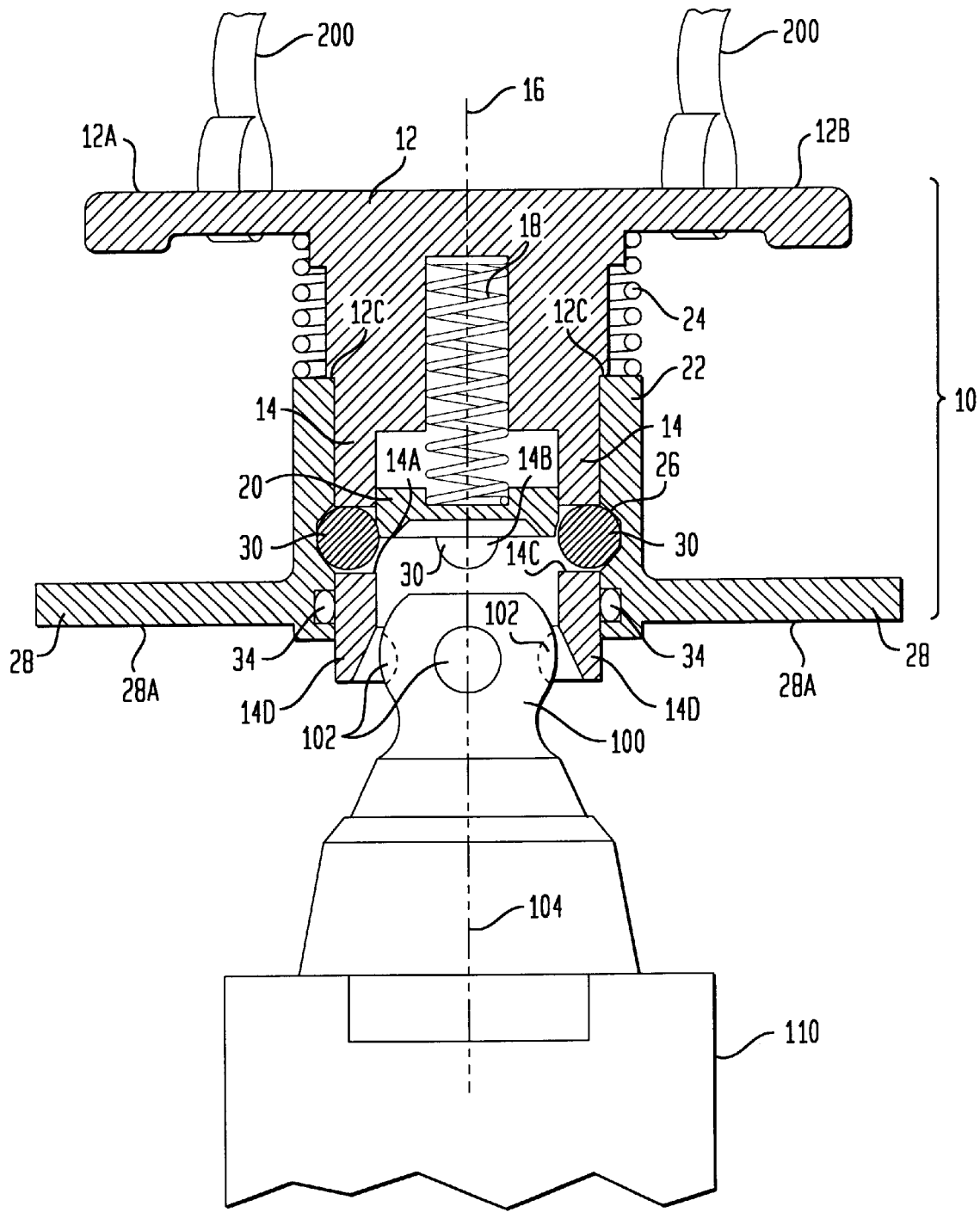
FIG. 1 is a cross-sectional view of the water-impact release mechanism according to the present invention in its release or unlocked position.

Referring now to the drawings, simultaneous reference will be made to FIGS. 1, 2 and 3 in order to explain the water-impact release mechanism of the present invention which is referenced generally by numeral 10 in FIGS. 1 and 2. In the illustrated embodiment, a dimpled tail nut or hitching ball 100 is the device to be engaged and released by release mechanism 10. Hitching ball 100 is typically attached to the aft end of a payload 110 (e.g., a torpedo) that is to be deployed in air over a body of water into which payload 110 is to fall. By way of example, hitching ball 100 has a plurality of spherical dimples 102 distributed about the periphery thereof in a plane perpendicular to the longitudinal axis 104 of hitching ball 100 and payload 110. This design of hitching ball 100 is one commonly used by the Navy.

Release mechanism 10 has a hub structure 12 which, for the illustrated embodiment, has a plurality of spokes, (only two spokes 12A and 12B are shown for sake of clarity,) extending radially away from the central portion of hub structure 12. Additional spokes can be provided as needed. Spokes 12A and 12B serve as attachment points for, in the case of the illustrated embodiment, risers 200 extending from an air stabilizing device (not shown) such as a parachute. The air stabilizing device decelerates payload 110 after its air-deployment and aligns payload 110 for a vertical (or nearly vertical) entry into the water.

A sleeve 14 extends from the central portion of hub structure 12. Sleeve 14 is provided with a plurality holes, e.g., holes 14A, 14B and 14C are shown, distributed about sleeve 14. For reasons that will become apparent below, the number of holes 14A–14C is commensurate with the number of dimples 102 on hitching ball 100. The center of holes 14A–14C lie in a plane perpendicular to longitudinal axis 16 of hub structure 12 and sleeve 14, and are distributed in a pattern commensurate with dimples 102.

A spring 18 is attached on one end thereof to hub 12 and extends into sleeve 14. Attached to the other end of spring 18 is a concave or cupped plate 20 which serves several functions. When spring 18 is in its relaxed state (as shown in FIG. 1) the outer edge of cupped plate 20 is aligned with holes 14A–14C. Since cupped plate 20 substantially spans the inside diameter of sleeve 14, holes 14A–14C are obstructed such that balls 30 cannot fall into the interior of sleeve 14 when spring 18 is relaxed. When spring 18 is in its compressed state (as shown in FIG. 2), holes 14A–14C are no longer obstructed by the cupped plate 20. The significance of this will become apparent from the operational description that is to follow the physical description of the present invention. The cupped shaped of plate 20 also serves to properly align longitudinal axis 104 (of hitching ball 100) and longitudinal axis 16 (of sleeve 14) when hitching ball 100 is installed in release mechanism 10.

A retainer sleeve 22 is concentric with sleeve 14 and is in sliding engagement therewith in an axial direction. Sleeve 22 is elastically coupled to the central portion of hub structure 12 by means of a spring 24. More specifically, spring 24 is attached on one end thereof to hub structure 12 and on the other end thereof to sleeve 22. Spring 24 is biased away from hub structure 12. Sleeve 22 is provided with an annular, inwardly-facing, V-shaped channel or groove 26 in a plane perpendicular to longitudinal axis 16. Groove 26 is positioned such that when sleeve 22 is moved to overcome the bias in spring 24, groove 26 can be aligned with holes 14A–14C. To assure such alignment, sleeve 22 is sized to abut hub structure 12 (for example, at annular shoulder 12C) when groove 26 is aligned with holes 14A–14C.

An impact or splash plate 28 is attached to or is integral with sleeve 22. Splash plate 28 extends radially out from sleeve 22 and beyond the confines of payload 110. In this way, splash plate 28 defines an annular surface 28A that receives the water impact forces as payload 110 completes its water entry. The size of the area presented by annular surface 28A is selected such that the minimum expected impact forces (represented by the arrows designated $F_i$ in FIG. 2) impinging on splash plate 28 are sufficient to overcome the bias in spring 24 and cause sleeve 22 to abut annular shoulder 12C.

As mentioned above, a ball 30 resides in each of holes 14A–14C. Each ball 30 must be large enough to extend beyond the confines of each hole 14A–14C as defined by the wall thickness of sleeve 14. In addition, for the illustrated embodiment, each ball 30 is sized such that it completely contacts the entire surface area of one of dimples 102 when pressed into engagement therewith.

In operation, hitching ball 100 must first be installed in release mechanism 10. Just prior to such installation, release mechanism 10 is configured as shown in FIG. 1. Specifically, spring 18 is in its relaxed state so that cupped plate 20 is positioned in front of holes 14A–14C, and sleeve 22 abuts hub structure 12 so that groove 26 is aligned with holes 14A–14C. As hitching ball 100 is pressed against cupped plate 20 along longitudinal axis 16, spring 18 is compressed towards hub structure 12. This frees balls 30 to be pressed into engagement with dimples 102. Note that this cannot occur unless dimples 102 are properly aligned with holes 14A–14C. Balls 30 are then pressed into engagement with dimples 102 as sleeve 22 is released. The natural bias of spring 24 causes sleeve 22 to move away from hub structure 12 while the V-shape of groove 26 facilitates the radially-inward pressing action of sleeve 22 on balls 30. Once hitching ball 100 is installed, release mechanism 10 is configured as shown in FIG. 2. Groove 26 is no longer aligned with holes 14A–14C so that sleeve 22 maintains balls 30 in engagement with dimples 102.

Figure 2:
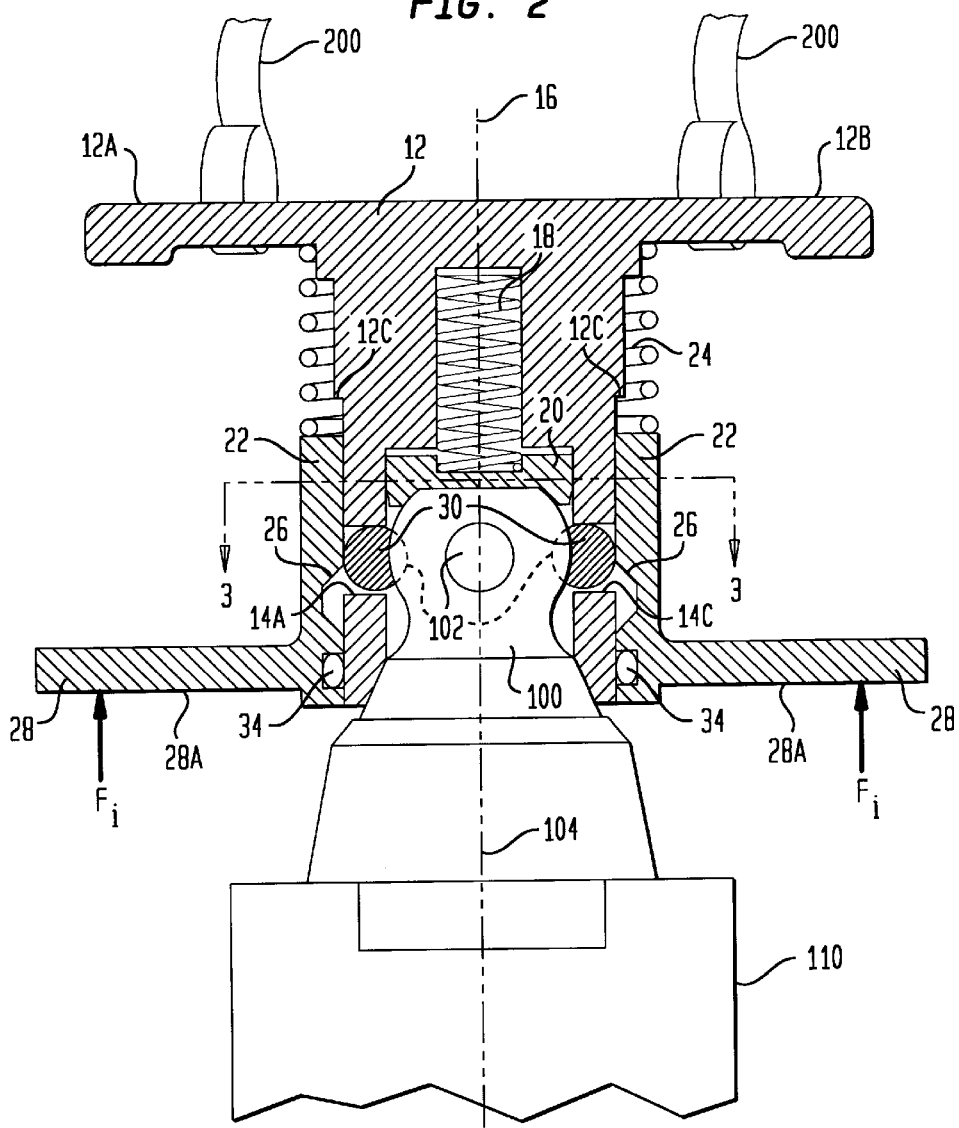
FIG. 2 is a cross-sectional view of the release mechanism in its locked position with the dimpled hitching ball of a payload engaged by the release mechanism.
Figure 3:
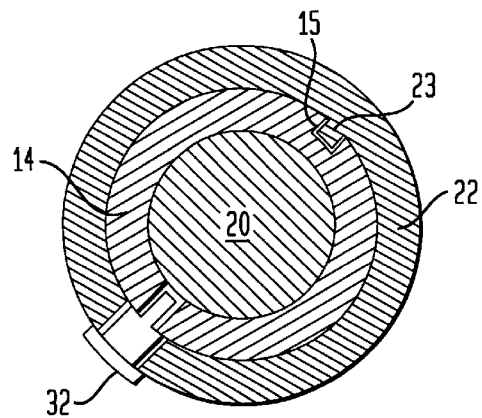
FIG. 3 is a sectional view taken along line 3—3 of FIG. 2.

To prevent unwanted axial movement of sleeve 22 that could lead to premature release of hitching ball 100, a retainer can be used to couple the two sleeves to one another when hitching ball 100 is installed (FIG. 2). The retainer should be frangible upon application of water-impact forces $F_i$ on annular surface 28A so that forces $F_i$ move sleeve 22 to abut hub structure 12 as described above. One embodiment of such a retainer is a shear pin or screw 32 (FIG. 3) that can be inserted through the wall of sleeve 22 and at least partially into the wall of sleeve 14 when hitching ball 100 is installed. Shear pin 32 is designed to fracture at the interface of sleeve 22 and sleeve 14 upon the application of water-impact forces $F_i$.

Although the present invention has been described relative to a particular embodiment, it is not so limited. For example, relative rotation between sleeves 22 and 14 may be prevented by indexing sleeve 22 to sleeve 14. One way of accomplishing this is shown in FIG. 3 where a vertical notch 15 in sleeve 14 receives an inward-facing rib or pin 23 coupled to sleeve 22. Pin 23 can slide within notch 15 to allow for axial movement between sleeves 14 and 22 while constraining any relative rotational movement. Vibrational chatter between sleeves 22 and 14 can be reduced or eliminated by the use of one (or more) o-ring 34 made of vibration damping material (e.g., rubber) interposed between the sleeves. Still further, depending on the shape of hitching ball 100, the inner portion of outboard end 14D of sleeve 14 can be specially configured to both properly align hitching ball 101 upon insertion and also serve as a limit stop to prevent hitching ball 100 from being inserted too far into sleeve 14. In the illustrated embodiment, the inner portion of end 14D is tapered to abut a corresponding taper on hitching ball 100. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A water-impact release mechanism, comprising:
   a hub;
   a first sleeve coupled to and extending from said hub, said first sleeve defining a plurality of holes distributed about the circumference of said first sleeve and extending therethrough;
   a spring assembly coupled to said hub and extending into said first sleeve wherein, in a relaxed state, said spring assembly obstructs said plurality of holes from within said first sleeve and wherein, in a compressed state, said spring assembly does not obstruct said plurality of holes from within said first sleeve;
   a second sleeve concentric with said first sleeve extending from said hub, said second sleeve elastically coupled to said hub and having a bias away therefrom wherein said second sleeve can move axially about said first sleeve, said second sleeve having an inwardly-facing annular groove formed therein in a plane perpendicular to a longitudinal axis of said second sleeve wherein, when said bias is overcome such that said second sleeve abuts said hub, said annular groove is aligned with said plurality of holes;

a plate coupled to said second sleeve and extending radially outward therefrom to define a water-impact surface, wherein water-impact forces impinging on said plate cause said bias to be overcome such that said second sleeve abuts said hub; and a plurality of balls, each said ball residing in a corresponding one of said plurality of holes, each of said plurality of balls being large enough to extend beyond the confines of said corresponding one of said plurality of holes, wherein said plurality of balls are pressed into engagement with a device to be released when the device is inserted into said first sleeve to compress said spring assembly to said compressed state and when said second sleeve is in a position such that said annular groove is misaligned with respect to said plurality of holes.

2. A mechanism as in claim 1 further comprising a frangible retainer coupled to said second sleeve for fixing said second sleeve in said position where said annular groove is misaligned with respect to said plurality of holes, wherein said frangible retainer releases said second sleeve when said water-impact forces impinge on said plate such that said bias is overcome and said second sleeve abuts said hub.

3. A mechanism as in claim 2 wherein said frangible retainer passes through a wall of said second sleeve and at least partially into a wall of said first sleeve.

4. A mechanism as in claim 1 further comprising vibration absorbing material interposed between a portion of said first sleeve and a portion of said second sleeve.

5. A mechanism as in claim 1 wherein said first sleeve and said second sleeve are indexed to one another for preventing relative rotation therebetween.

6. A mechanism as in claim 1 wherein said annular groove is v-shaped in cross section.

7. A water-impact release mechanism for coupling an air-stabilizer to the aft end of a payload that has been deployed in air over a body of water into which said payload will fall, the aft end of said payload terminating in a hitching ball having a plurality of dimples distributed about the periphery thereof in a plane perpendicular to a longitudinal axis of said payload, said mechanism comprising:

a hub having a plurality of spokes serving as attachment points for said air-stabilizer;

a first sleeve coupled to and extending from said hub, said first sleeve defining a plurality of holes distributed about the circumference of said first sleeve and extending therethrough;

a first spring coupled on one end thereof to said hub and extending into said first sleeve;

a cupped plate coupled to another end of said first spring and substantially spanning the inside diameter of said first sleeve wherein, when said first spring is in a relaxed state, said cupped plate obstructs said plurality of holes from within said first sleeve and wherein, when said first spring is in a compressed state, said cupped plate does not obstruct said plurality of holes from within said first sleeve;

a second sleeve concentric with said first sleeve extending from said hub;

a second spring coupled on one end thereof to said hub and having a bias away therefrom, said second spring coupled on another end thereof to said second sleeve wherein said second sleeve can move axially about said first sleeve with movement of said second spring;

said second sleeve having an inwardly-facing annular groove formed therein in a plane perpendicular to a longitudinal axis of said second sleeve wherein, when said bias is overcome such that said second sleeve abuts said hub, said annular groove is aligned with said plurality of holes;

an impact plate coupled to said second sleeve and extending radially outward therefrom to define a water-impact surface, wherein water-impact forces impinging on said impact plate cause said bias to be overcome such that said second sleeve abuts said hub; and a plurality of balls, each said ball residing in a corresponding one of said plurality of holes, each of said plurality of balls being large enough to extend beyond the confines of said corresponding one of said plurality of holes, wherein each of said plurality of balls is pressed into engagement with one of said dimples of said hitching ball when said hitching ball is inserted into said first sleeve and pressed into said cupped plate to compress said first spring to said compressed state, and when said second sleeve is in a position such that said annular groove is misaligned with respect to said plurality of holes.

8. A mechanism as in claim 7 further comprising a frangible retainer coupled to said second sleeve for fixing said second sleeve in said position where said annular groove is misaligned with respect to said plurality of holes, wherein said frangible retainer releases said second sleeve when said water-impact forces impinge on said plate such that said bias is overcome and said second sleeve abuts said hub.

9. A mechanism as in claim 8 wherein said frangible retainer is a shear pin passing through a wall of said second sleeve and at least partially into a wall of said first sleeve, wherein said shear pin fractures when said impact plate is subjected to said water-impact forces.

10. A mechanism as in claim 7 further comprising at least one vibration absorbing o-ring interposed between a portion of said first sleeve and a portion of said second sleeve.

11. A mechanism as in claim 7 wherein said first sleeve and said second sleeve are indexed to one another for preventing relative rotation therebetween.

12. A mechanism as in claim 7 wherein each of said plurality of balls is sized to contact the entire surface area of one of said dimples when said plurality of balls are pressed into engagement with said dimples.

13. A mechanism as in claim 7 wherein said annular groove is v-shaped in cross section.

* * * * *